United States Patent
Rowe

(10) Patent No.: US 11,780,082 B2
(45) Date of Patent: Oct. 10, 2023

(54) ARTIFICIAL MUSCLES COMPRISING A PASS THROUGH OPENING AND ARTIFICIAL MUSCLE ASSEMBLIES INCLUDING SAME

(71) Applicant: Toyota Motor Engineering & Manufacturing North America, Inc., Plano, TX (US)

(72) Inventor: Michael P. Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/682,932

(22) Filed: Feb. 28, 2022

(65) Prior Publication Data
US 2023/0271315 A1     Aug. 31, 2023

(51) Int. Cl.
*B25J 9/14* (2006.01)
*B25J 9/10* (2006.01)

(52) U.S. Cl.
CPC ............. *B25J 9/1075* (2013.01); *B25J 9/142* (2013.01)

(58) Field of Classification Search
CPC ........ F15B 15/103; B25J 9/1075; B25J 9/142; F03G 7/0645; A61B 34/70
See application file for complete search history.

(56) References Cited

U.S. PATENT DOCUMENTS

| | | |
|---|---|---|
| 8,981,621 B2 | 3/2015 | Joseph |
| 10,995,779 B2 * | 5/2021 | Keplinger ............... H02N 1/006 |
| 11,028,835 B2 | 6/2021 | Lima et al. |
| 2021/0285471 A1 | 9/2021 | Keplinger et al. |
| 2021/0369547 A1 | 12/2021 | Mau et al. |
| 2021/0370499 A1 | 12/2021 | Rowe et al. |

FOREIGN PATENT DOCUMENTS

WO     2016011345 A1     1/2016

OTHER PUBLICATIONS

Acome et al; "Hydraulically amplified self-healing electrostatic actuators with muscle-like performance"; Science Jan. 5, 2018: vol. 359, Issue 6371; pp. 61-65.

* cited by examiner

*Primary Examiner* — Randell J Krug
(74) *Attorney, Agent, or Firm* — Dinsmore & Shohl LLP

(57) ABSTRACT

An artificial muscle includes a housing having an electrode region, an expandable fluid region, and a pass through region formed between the electrode region and the expandable fluid region. The artificial muscle further includes an electrode pair having a first electrode and a second electrode, at least one of the first electrode and the second electrode including a central opening coaxial with the pass through region and the expandable fluid region, and a dielectric fluid is disposed in the housing. The electrode pair is actuatable between a non-actuated state and an actuated state such that actuation from the non-actuated state to the actuated state directs the dielectric fluid into the expandable fluid region.

20 Claims, 9 Drawing Sheets

US 11,780,082 B2

ARTIFICIAL MUSCLES COMPRISING A PASS THROUGH OPENING AND ARTIFICIAL MUSCLE ASSEMBLIES INCLUDING SAME

TECHNICAL FIELD

The present specification generally relates to apparatuses and methods for focused inflation on at least one surface of a device, and, more specifically, apparatuses and methods for utilizing an electrode pair to direct a fluid to inflate the device.

BACKGROUND

Current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluidic actuators, but fluidic actuators require a supply of pressurized gas or liquid, and fluid transport must occur through systems of channels and tubes, limiting the speed and efficiency of the artificial muscles. Other artificial muscles use thermally activated polymer fibers, but these are difficult to control and operate at low efficiencies. These artificial muscles may be arranged in a stack to provide increased displacement of an object. However, this stacked arrangement requires a substantial increase in space due to the size of each artificial muscle when in an actuated state.

Accordingly, a need exists for improved artificial muscles that permit increased displacement of an object without substantially increasing a size of an artificial muscle assembly including a plurality of artificial muscles arranged in a stack.

SUMMARY

In one embodiment, an artificial muscle includes a housing including an electrode region, an expandable fluid region, and a pass through region formed between the electrode region and the expandable fluid region, an electrode pair including a first electrode and a second electrode, at least one of the first electrode and second electrode including a central opening coaxial with the pass through region and the expandable fluid region, and a dielectric fluid housed within the housing. The electrode pair is actuatable between a non-actuated state and an actuated state such that actuation from the non-actuated state to the actuated state directs the dielectric fluid into the expandable fluid region.

In another embodiment, an artificial muscle assembly including a plurality of artificial muscles, each artificial muscle having a housing including an electrode region, an expandable fluid region, and a pass through region formed between the electrode region and the expandable fluid region, an electrode pair including a first electrode and a second electrode, at least one of the first electrode and second electrode including a central opening coaxial with the pass through region and the expandable fluid region, and a dielectric fluid housed within the housing. The plurality of artificial muscles are arranged in a stack such that the expandable fluid region of each artificial muscle is coaxially aligned with the pass through opening of an adjacent one of the plurality of artificial muscles, and the electrode pair of each artificial muscle is actuatable between a non-actuated state and an actuated state such that actuation from the non-actuated state to the actuated state directs the dielectric fluid into the expandable fluid region and the expandable fluid region passes through a pass through region of an adjacent artificial muscle.

In yet another embodiment, an artificial muscle assembly including a plurality of artificial muscles, with each artificial muscle being identical in structure and each artificial muscle including an expandable fluid region, a pass through region adjacent the expandable fluid region, and an electrode region surrounding the expandable fluid region and the pass through region. The plurality of artificial muscles are positioned such that the expandable fluid region of each artificial muscle is coaxial with a corresponding pass through region of an adjacent artificial muscle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
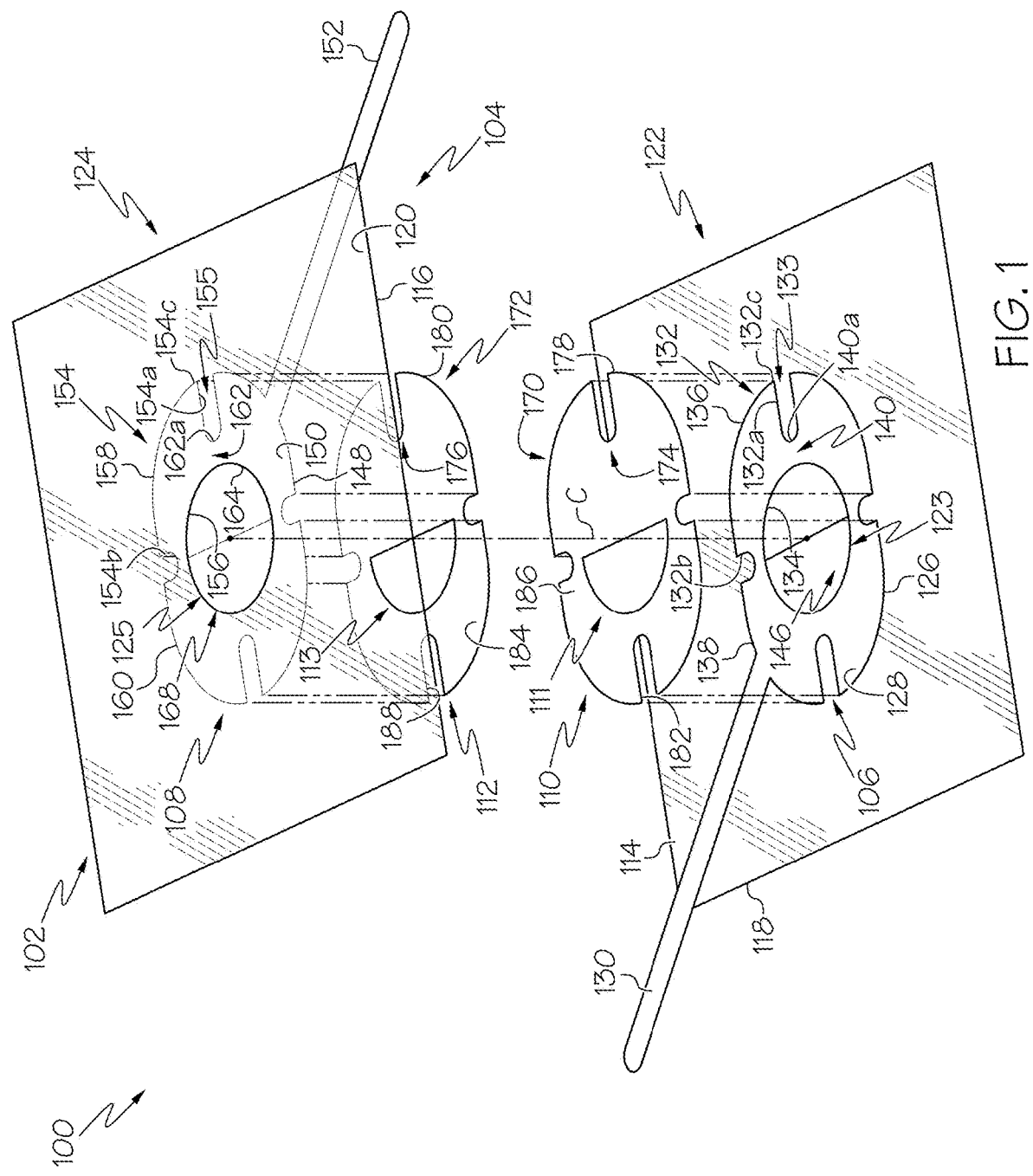
FIG. 1 schematically depicts an exploded view of an example artificial muscle, according to one or more embodiments shown and described herein.

Embodiments described herein are directed to artificial muscles and artificial muscle assemblies that include a plurality of artificial muscles. The artificial muscles described herein are actuatable to selectively raise and lower a region of the artificial muscles to provide a selective, on demand inflated expandable fluid region. The artificial muscles include a housing and an electrode pair. A dielectric fluid is housed within the housing, and the housing includes an electrode region and an expandable fluid region, where the electrode pair is positioned in the electrode region. The expandable fluid region is adjacent a pass through opening. The electrode pair includes a first electrode, which may be fixed to a first surface of the housing and a second electrode, which may be fixed to a second surface of the housing. The electrode pair is actuatable between a non-actuated state and an actuated state such that actuation from the non-actuated state to the actuated state directs the dielectric fluid into the expandable fluid region. This expands the expandable fluid region, raising a portion of the artificial muscle on demand. Various embodiments of the artificial muscles and the operation of the artificial muscles are described in more detail herein. Whenever possible, the same reference numerals will be used throughout the drawings to refer to the same or like parts.

Figure 2:
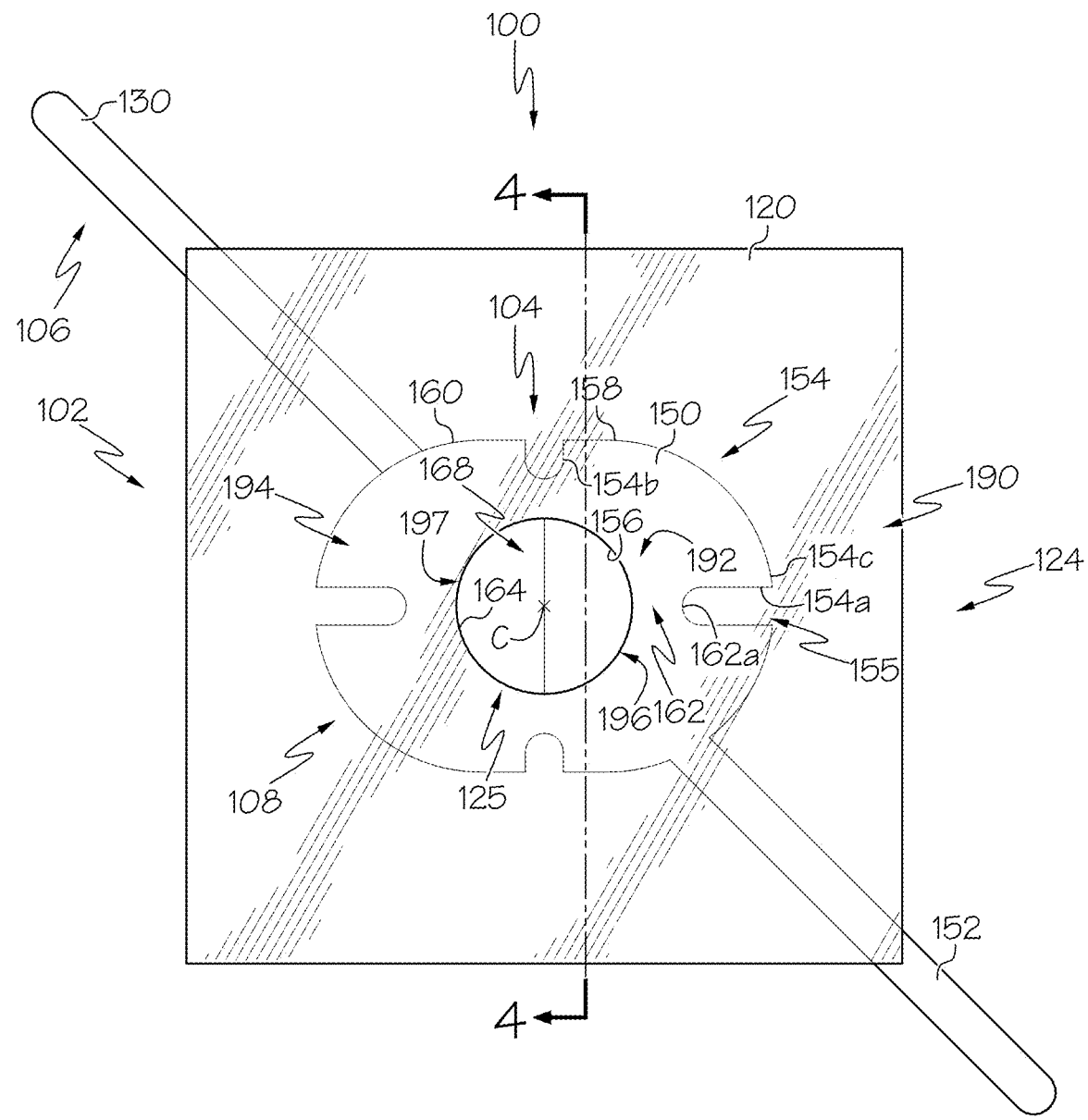
FIG. 2 schematically depicts a top view of the artificial muscle of FIG. 1, according to one or more embodiments shown and described herein.

Referring now to FIGS. 1 and 2, an artificial muscle 100 is shown. The artificial muscle 100 includes a housing 102, an electrode pair 104 including a first electrode 106 and a second electrode 108 fixed to opposite surfaces of the housing 102, a first electrical insulator layer 110 fixed to the first electrode 106, and a second electrical insulator layer 112 fixed to the second electrode 108. In some embodiments, the housing 102 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 102 are heat-sealable. In other embodiments, the housing 102 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

In some embodiments, the first film layer 122 and the second film layer 124 may further include a pass through opening 123, 125, respectively, with the pass through openings 123, 125 being coaxial one another.

Throughout the ensuing description, reference may be made to the housing 102 including the first film layer 122 and the second film layer 124, as opposed to the one-piece housing. It should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

Figure 10:
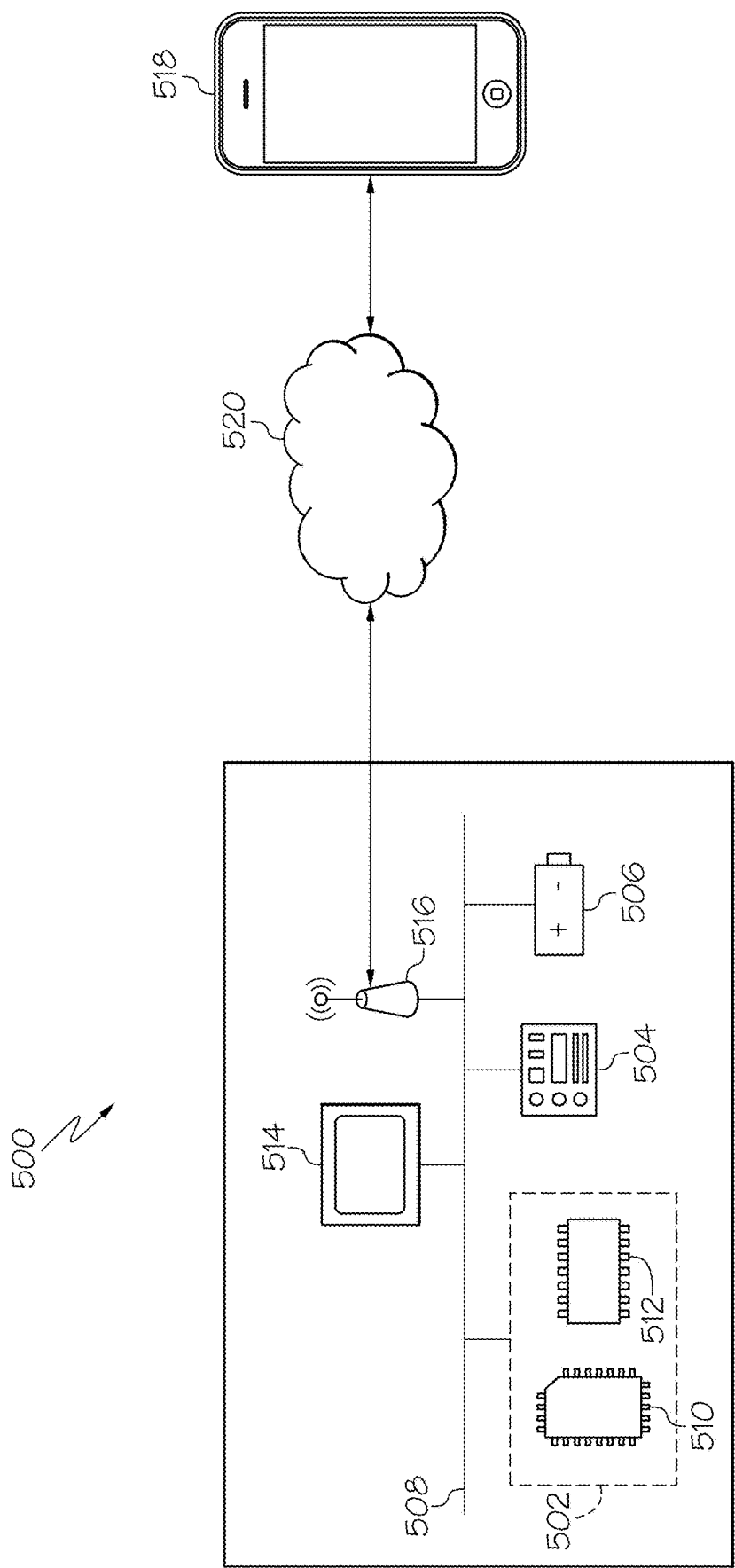
FIG. 10 schematically depicts an actuation system for operating the artificial muscle of FIG. 1, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 500, as shown in FIG. 10. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 500 to actuate the second electrode 108.

With respect now to the first electrode 106, in embodiments, the first electrode 106 may include two or more fan portions 132 extending radially from a center axis C of the artificial muscle 100. In some embodiments, the first electrode 106 may include only two fan portions 132 positioned on opposite sides or ends of the first electrode 106. In some embodiments, the first electrode 106 may include more than two fan portions 132, such as three, four, or five fan portions 132. In embodiments in which the first electrode 106 includes an even number of fan portions 132, the fan portions 132 may be arranged in two or more pairs of fan portions 132. As shown in FIG. 1, the first electrode 106 includes four fan portions 132. In this embodiment, the four fan portions 132 are arranged in two pairs of fan portions 132, where the two individual fan portions 132 of each pair are diametrically opposed to one another.

Each fan portion 132 has a first side edge 132a and an opposite second side edge 132b. As shown, the first terminal 130 extends from the second end 136 of one of the fan portions 132 and is integrally formed therewith. A channel 133 is at least partially defined by opposing side edges 132a, 132b of adjacent fan portions 132 and, thus, extends radially toward the center axis C. The channel 133 terminates at an end 140a of a bridge portion 140 interconnecting adjacent fan portions 132.

As shown in FIG. 1, dividing lines D are included to depict the boundary between the fan portions 132 and the bridge portions 140. The dividing lines D extend from the side edges 132a, 132b of the fan portions 132 to the first end 134 of the fan portions 132 collinear with the side edges 132a, 132b. It should be understood that dividing lines D are shown in FIG. 1 for clarity and that the fan portions 132 are integral with the bridge portions 140. The first end 134 of the fan portion 132, which extends between adjacent bridge portions 140, defines an inner length of the fan portion 132. Due to the geometry of the fan portion 132 tapering toward the center axis C between the first side edge 132a and the second side edge 132b, the second end 136 of the fan portion 132 defines an outer length of the fan portion 132 that is greater than the inner length of the fan portion 132.

Moreover, each fan portion 132 has a pair of corners 132c defined by an intersection of the second end 136 and each of the first side edge 132a and the second side edge 132b of the fan portion 132. In embodiments, the corners 132c are formed at an angle equal to or less than 90 degrees. In other embodiments, the corners 132c are formed at an acute angle.

As shown in FIG. 1, each fan portion 132 has a first side length defined by a distance between the first end 134 of the fan portion 132 and the second end 136 of the fan portion 132 along the first side edge 132a and the dividing line D that is collinear with the first side edge 132a. Each fan portion 132 also has a second side length defined by a distance between the first end 134 of the fan portion 132 and the second end 136 of the fan portion 132 along the second side edge 132b and the dividing line D that is collinear with the second side edge 132b. In embodiments, the first side length is greater than the second side length of the fan portion 132 such that the first electrode 106 has an ellipsoid geometry.

The second end 136, the first side edge 132a and the second side edge 132b of each fan portion 132, and the bridge portions 140 interconnecting the fan portions 132 define an outer perimeter 138 of the first electrode 106. In embodiments, a central opening 146 is formed within the first electrode 106 between the fan portions 132 and the bridge portions 140, and is coaxial with the center axis C. Each fan portion 132 has a fan length extending from a perimeter 142 of the central opening 146 to the second end 136 of the fan portion 132. Each bridge portion 140 has a bridge length extending from a perimeter 142 of the central opening 146 to the end 140a of the bridge portion 140, i.e., the channel 133. As shown, the bridge length of each of the bridge portions 140 is substantially equal to one another. Each channel 133 has a channel length defined by a distance between the end 140a of the bridge portion 140 and the second end of the fan portion 132. Due to the bridge length of each of the bridge portions 140 being substantially equal to one another and the first side length of the fan portions 132 being greater than the second side length of the fan portions 132, a first pair of opposite channels 133 has a channel length greater than a channel length of a second pair of opposite channels 133. As shown, a width of the channel 133 extending between opposing side edges 132a, 132b of adjacent fan portions 132 remains substantially constant due to opposing side edges 132a, 132b being substantially parallel to one another.

In embodiments, the central opening 146 has a radius of 2 centimeters (cm) to 5 cm. In embodiments, the central opening 146 has a radius of 3 cm to 4 cm. In embodiments, a total fan area of each of the fan portions 132 is equal to or greater than twice an area of the central opening 146. It should be appreciated that the ratio between the total fan area of the fan portions 132 and the area of the central opening 146 is directly related to a total amount of deflection of the first film layer 122 when the artificial muscle 100 is actuated, as discussed herein. In embodiments, the bridge length is 20% to 50% of the fan length. In embodiments, the bridge length is 30% to 40% of the fan length. In embodiments in which the first electrode 106 does not include the central opening 146, the fan length and the bridge length may be measured from a perimeter of an imaginary circle coaxial with the center axis C.

Similar to the first electrode 106, the second electrode 108, in embodiments, includes two or more fan portions 154 extending radially from the center axis C of the artificial muscle 100. The second electrode 108 includes substantially the same structure as the first electrode 106 and, thus, includes the same number of fan portions 154. Specifically, the second electrode 108 is illustrated as including four fan portions 154. However, it should be appreciated that the second electrode 108 may include any suitable number of fan portions 154.

Each fan portion 154 of the second electrode 108 has a first side edge 154a and an opposite second side edge 154b. As shown, the second terminal 152 extends from the second end 158 of one of the fan portions 154 and is integrally formed therewith. A channel 155 is at least partially defined by opposing side edges 154a, 154b of adjacent fan portions 154 and, thus, extends radially toward the center axis C. The channel 155 terminates at an end 162a of a bridge portion 162 interconnecting adjacent fan portions 154.

As shown in FIG. 1, additional dividing lines D are included to depict the boundary between the fan portions 154 and the bridge portions 162. The dividing lines D extend from the side edges 154a, 154b of the fan portions 154 to the first end 156 of the fan portions 154 collinear with the side edges 154a, 154b. It should be understood that dividing lines D are shown in FIG. 1 for clarity and that the fan portions 154 are integral with the bridge portions 162. The first end 156 of the fan portion 154, which extends between adjacent bridge portions 162, defines an inner length of the fan portion 154. Due to the geometry of the fan portion 154 tapering toward the center axis C between the first side edge 154a and the second side edge 154b, the second end 158 of the fan portion 154 defines an outer length of the fan portion 154 that is greater than the inner length of the fan portion 154.

Moreover, each fan portion 154 has a pair of corners 154c defined by an intersection of the second end 158 and each of the first side edge 154a and the second side edge 154b of the fan portion 154. In embodiments, the corners 154c are formed at an angle equal to or less than 90 degrees. In other embodiments, the corners 154c are formed at an acute angle. As described in more detail herein, during actuation of the artificial muscle 100, the corners 132c of the first electrode 106 and the corners 154c of the second electrode 108 are configured to be attracted to one another at a lower voltage as compared to the rest of the first electrode 106 and the second electrode 108. Thus, actuation of the artificial muscle 100 initially at the corners 132c, 154c results the outer perimeter 138 of the first electrode 106 and the outer perimeter 160 of the second electrode 108 being attracted to one another at a lower voltage and reducing the likelihood of air pockets or voids forming between the first electrode 106 and the second electrode 108 after actuation of the artificial muscle 100.

As shown in FIGS. 1 and 2, in embodiments, the first side edge 154a of each fan portion 154 has a first side length defined by a distance between the first end 156 of the fan portion 154 and the second end 158 of the fan portion 154 along the first side edge 154a and the dividing line D that is collinear with the first side edge 154a. Each fan portion 154 also has a second side length defined by a distance between the first end 156 of the fan portion 154 and the second end 158 of the fan portion 154 along the second side edge 154b and the dividing line D that is collinear with the second side edge 154b. In embodiments, the first side length is greater than the second side length of the fan portion 154 such that the second electrode 108 has an ellipsoid geometry corresponding to the geometry of the first electrode 106.

The second end 158, the first side edge 154a and the second side edge 154b of each fan portion 154, and the bridge portions 162 interconnecting the fan portions 154 define an outer perimeter 160 of the second electrode 108. In embodiments, a central opening 168 is formed within the second electrode 108 between the fan portions 154 and the bridge portions 162, and is coaxial with the center axis C. Each fan portion 154 has a fan length extending from a perimeter 164 of the central opening 168 to the second end 158 of the fan portion 154. Each bridge portion 162 has a bridge length extending from the central opening 168 to the end 162a of the bridge portion 162, i.e., the channel 155. As shown, the bridge length of each of the bridge portions 162 is substantially equal to one another. Each channel 155 has a channel length defined by a distance between the end 162a of the bridge portion 162 and the second end of the fan portion 154. Due to the bridge length of each of the bridge portions 162 being substantially equal to one another and the first side length of the fan portions 154 being greater than the second side length of the fan portions 154, a first pair of opposite channels 155 has a channel length greater than a channel length of a second pair of opposite channels 155. As shown, a width of the channel 155 extending between opposing side edges 154a, 154b of adjacent fan portions 154 remains substantially constant due to opposing side edges 154a, 154b being substantially parallel to one another.

In embodiments, the central opening 168 has a radius of 2 cm to 5 cm. In embodiments, the central opening 168 has a radius of 3 cm to 4 cm. In embodiments, a total fan area of each of the fan portions 154 is equal to or greater than twice an area of the central opening 168. It should be appreciated that the ratio between the total fan area of the fan portions 154 and the area of the central opening 168 is directly related to a total amount of deflection of the second film layer 124 when the artificial muscle 100 is actuated. In embodiments, the bridge length is 20% to 50% of the fan length. In embodiments, the bridge length is 30% to 40% of the fan length. In embodiments in which the second electrode 108 does not include the central opening 168, the fan length and the bridge length may be measured from a perimeter of an imaginary circle coaxial with the center axis C.

Referring again to FIG. 1, the first electrical insulator layer 110 and the second electrical insulator layer 112 have a substantially ellipsoid geometry generally corresponding to the geometry of the first electrode 106 and the second electrode 108, respectively. Thus, in embodiments, the first electrical insulator layer 110 and the second electrical insulator layer 112 each have fan portions 170, 172 and bridge portions 174, 176 corresponding to like portions on the first electrode 106 and the second electrode 108. Further, the first electrical insulator layer 110 and the second electrical insulator layer 112 each have an outer perimeter 178, 180 corresponding to the outer perimeter 138 of the first electrode 106 and the outer perimeter 160 of the second electrode 108, respectively, when positioned thereon. Additionally, the first electrical insulator layer 110 and second electrical insulator layer 112 may each include a pass through opening 111, 113 positioned coaxially with the pass through opening 123 formed in the first film layer 122 and the pass through opening 125 formed in the second film layer 124.

It should be appreciated that, in some embodiments, the first electrical insulator layer 110 and the second electrical insulator layer 112 generally include the same structure and composition. As such, in some embodiments, the first electrical insulator layer 110 and the second electrical insulator layer 112 each include an adhesive surface 182, 184 and an opposite non-sealable surface 186, 188, respectively. Thus, in some embodiments, the first electrical insulator layer 110 and the second electrical insulator layer 112 are each a polymer tape adhered to the inner surface 128 of the first electrode 106 and the inner surface 150 of the second electrode 108, respectively.

Figure 4:
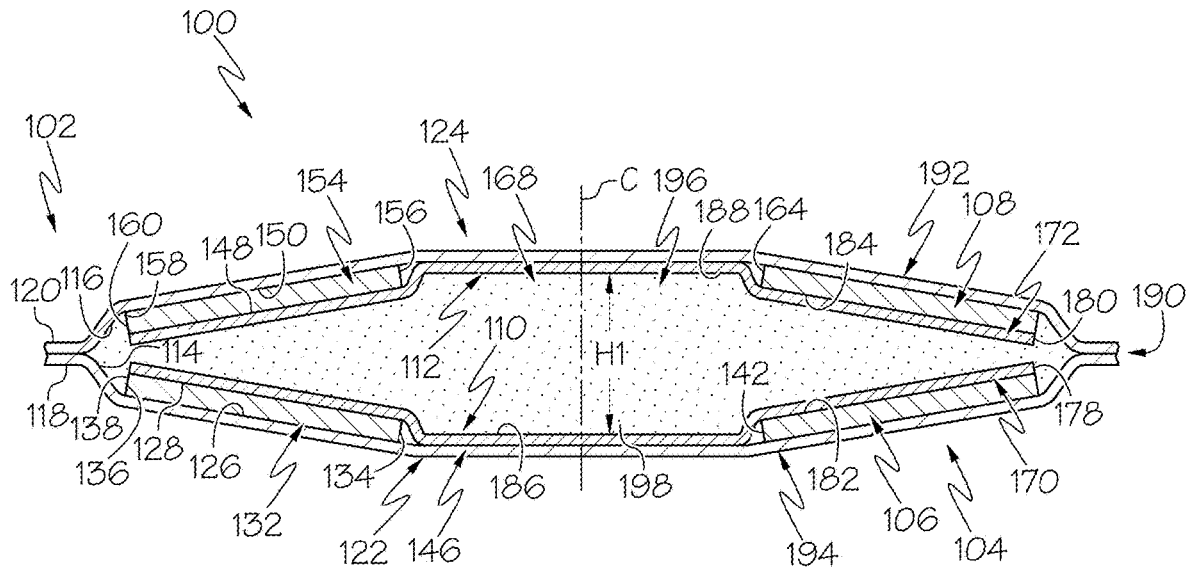
FIG. 4 schematically depicts a cross-sectional view of the artificial muscle of FIG. 1 taken along line 4-4 in FIG. 2 in a non-actuated state, according to one or more embodiments shown and described herein.
Figure 5:
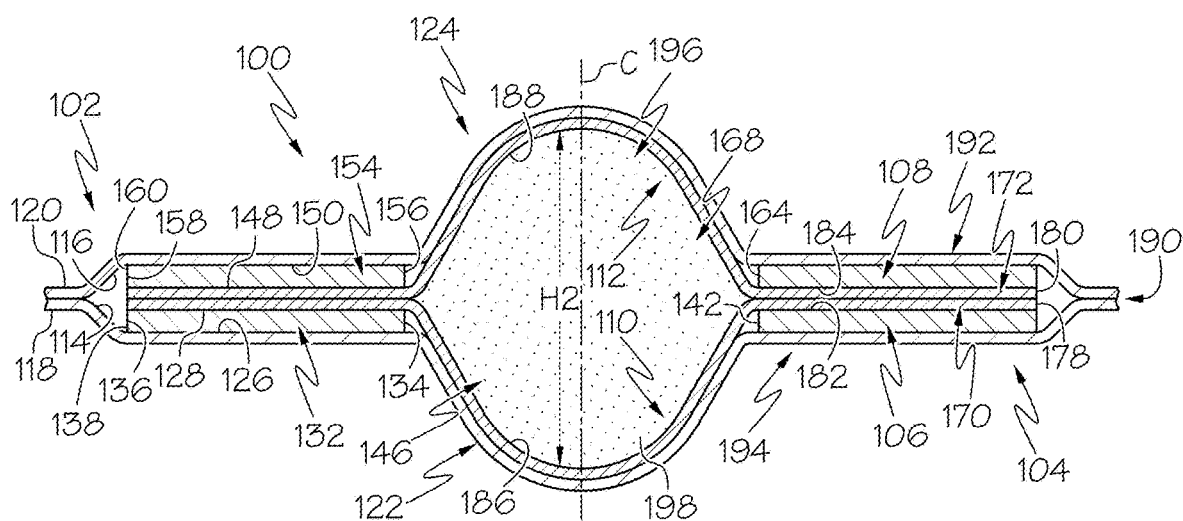
FIG. 5 schematically depicts a cross-sectional view of the artificial muscle of FIG. 4 in an actuated state, according to one or more embodiments shown and described herein.

Referring now to FIGS. 2, 4, and 5, the artificial muscle 100 is shown in its assembled form with the first terminal 130 of the first electrode 106 and the second terminal 152 of the second electrode 108 extending past an outer perimeter of the housing 102, i.e., the first film layer 122 and the second film layer 124. As shown in FIG. 2, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 110, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. In these embodiments, the first film layer 122 may be further heat-sealed to the second film layer 124 at an edge defining the pass through opening 123, 125 of each film layer 122, 124, respectively. By sealing the first film layer 122 and second film layer 124 along their respective pass through openings 123, 125, dielectric fluid is unable to escape the artificial muscle 100 via the pass through openings 123, 125 in the first and second film layers 122, 124. It should be noted that the first film layer 122 and the second film layer 124 may be sealed in any suitable manner, such as using an adhesive, heat sealing, vacuum sealing, or the like.

The first electrode 106, the second electrode 108, the first electrical insulator layer 110, and the second electrical insulator layer 112 provide a barrier that prevents the first film layer 122 from sealing to the second film layer 124 forming an unsealed portion 192. The unsealed portion 192 of the housing 102 includes an electrode region 194, in which the electrode pair 104 is provided, an expandable fluid region 196, which is surrounded by the electrode region 194, and a pass through region 197 formed between the electrode region 194 and the expandable fluid region 196. The central openings 146, 168 of the first electrode 106 and the second electrode 108 may define, i.e., encircle, the expandable fluid region 196 and the pass through region 197, and are arranged to be axially stacked on one another. In these embodiments, the expandable fluid region 196 and the pass through region 197 may be equal in size, such that each of the expandable fluid region 196 and the pass through region 197 occupy half of the region defined by the central openings 146, 168 of the first electrode 106 and the second electrode 108. It should be appreciated that, in other embodiments, the size of the expandable fluid region 196 and the pass through region 197 may differ in size such that the pass through region 197 is greater than the expandable fluid region 196. Although not shown, the housing 102 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Figure 3:
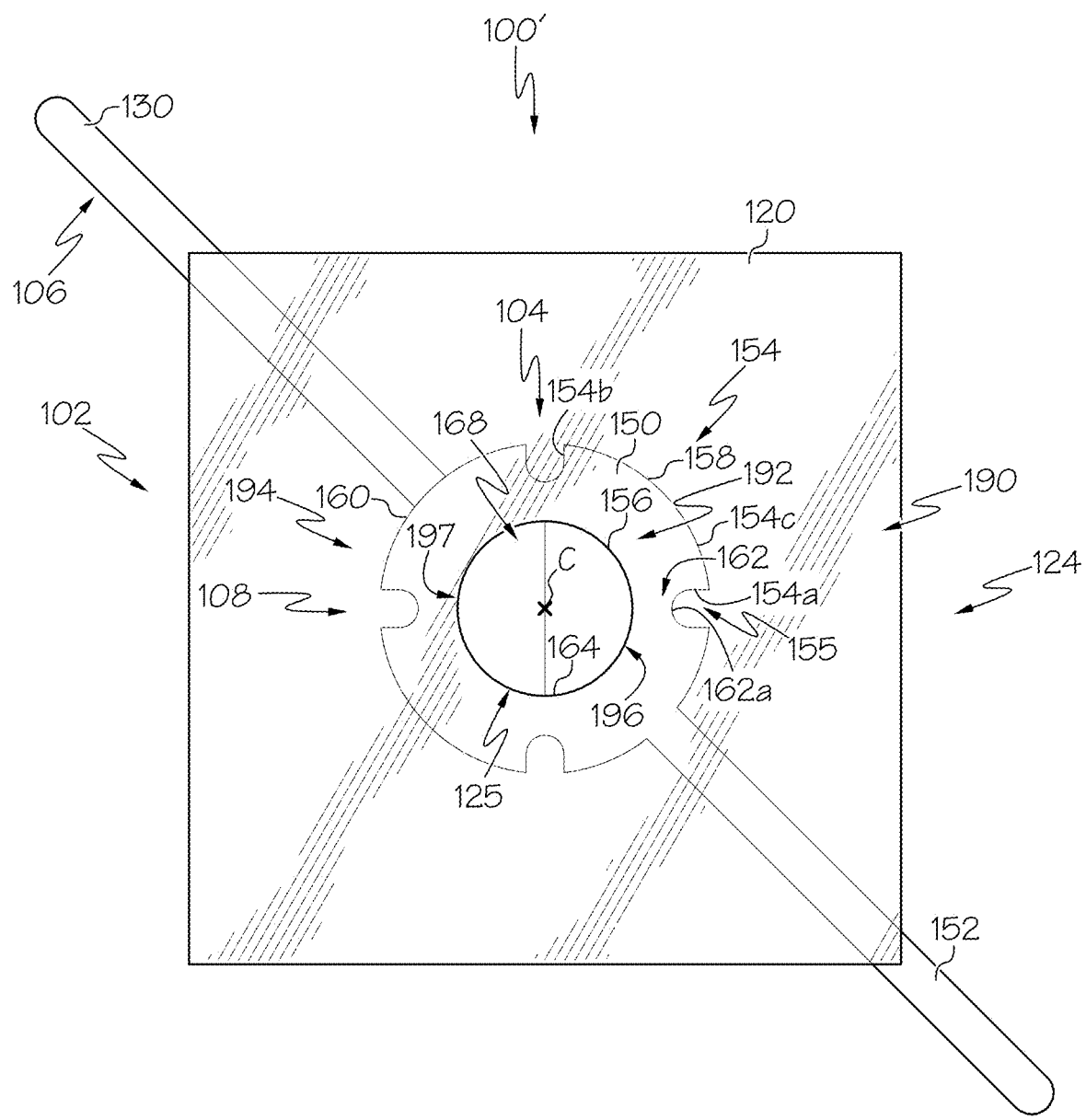
FIG. 3 schematically depicts a top view of another example artificial muscle, according to one or more embodiments shown and described herein.

Referring now to FIG. 3, an alternative embodiment of an artificial muscle 100' is illustrated. It should be appreciated that the artificial muscle 100' is similar to the artificial muscle 100 described herein. As such, like structure is indicated with like reference numerals. The first electrode 106 and the second electrode 108 of the artificial muscle 100' have a circular geometry as opposed to the ellipsoid geometry of the first electrode 106 and the second electrode 108 of the artificial muscle 100 described herein. As shown in FIG. 3, with respect to the second electrode 108, a first side edge length of the first side edge 154a is equal to a second side edge length of the second side edge 154b. Accordingly, the channels 155 formed between opposing side edges 154a, 154b of the fan portions 154 each have an equal length. Although the first electrode 106 is hidden from view in FIG. 3 by the second electrode 108, it should be appreciated that the first electrode 106 also has a circular geometry corresponding to the geometry of the second electrode 108.

Referring now to FIGS. 4 and 5, the artificial muscle 100 is shown actuatable between a non-actuated state and an actuated state. In the non-actuated state, as shown in FIG. 4, the first electrode 106 and the second electrode 108 are partially spaced apart from one another proximate the central openings 146, 168 thereof and the first end 134, 156 of the fan portions 132, 154. The second end 136, 158 of the fan portions 132, 154 remain in position relative to one another due to the housing 102 being sealed at the outer perimeter 138 of the first electrode 106 and the outer perimeter 160 of the second electrode 108. In the actuated state, as shown in FIG. 5, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196.

Referring now to FIG. 4, the artificial muscle 100 is shown in the non-actuated state. The electrode pair 104 is provided within the electrode region 194 of the unsealed portion 192 of the housing 102. The central opening 146 of the first electrode 106 and the central opening 168 of the second electrode 108 are coaxially aligned with the expandable fluid region 196 and the pass through region 197 such that the central openings 146, 168 encircle the expandable fluid region 196 and the pass through region 197. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the fan portions 132, 154 are brought into contact with one another. Thus, dielectric fluid 198 is provided between the first electrode 106 and the second electrode 108, thereby separating the first end 134, 156 of the fan portions 132, 154 proximate the expandable fluid region 196. Stated another way, a distance between the first end 134 of the fan portion 132 of the first electrode 106 and the first end 156 of the fan portion 154 of the second electrode 108 is greater than a distance between the second end 136 of the fan portion 132 of the first electrode 106 and the second end 158 of the fan portion 154 of the second electrode 108. This results in the electrode pair 104 zippering toward the expandable fluid region 196 when actuated. More particularly, zippering of the electrode pair 104 is initiated at the corners 132c of the first electrode 106 and the corners 154c of the second electrode 108, as discussed herein. In some embodiments, the first electrode 106 and the second electrode 108 may be flexible. Thus, as shown in FIG. 4, the first electrode 106 and the second electrode 108 are convex such that the second ends 136, 158 of the fan portions 132, 154 thereof may remain close to one another, but spaced apart from one another proximate the central openings 146, 168. In the non-actuated state, the expandable fluid region 196 has a first height H1.

When actuated, as shown in FIG. 5, the first electrode 106 and the second electrode 108 zipper toward one another from the second ends 136, 158 of the fan portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary. Although the pass through region 197 is not illustrated in FIGS. 4 and 5, it should be appreciated that during actuation of the artificial muscle 100, the dielectric fluid 198 is directed to flow around the pass through region 197, due to the first film layer 122 and the second film layer 124 layer being partially heat sealed to one another within the pass through regions 197 of the first electrical insulator layer 110 and the second electrical insulator layer 112, such that the dielectric fluid 198 enters the expandable fluid region 196.

In order to move the first electrode 106 and the second electrode 108 toward one another, a voltage is applied by a power supply. In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 110 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments disclosed herein, specifically, the fan portions 132, 154 with the interconnecting bridge portions 140, 162, provide a number of improvements over actuators, such as HASEL actuators, that do not include the fan portions 132, 154. Embodiments of the artificial muscle 100 including fan portions 132, 154 on each of the first electrode 106 and the second electrode 108, respectively, increases the surface area and, thus, displacement at the expandable fluid region 196 without increasing the amount of voltage required as compared to known HASEL actuators including donut-shaped electrodes having a uniform, radially-extending width. In addition, the corners 132c, 154c of the fan portions 132, 154 of the artificial muscle 100 provide zipping fronts that result in focused and directed zipping along the outer perimeters 138, 160 of the first electrode 106 and the second electrode 108 during actuation as compared to HASEL actuators including donut-shaped electrodes. Specifically, one pair of fan portions 132, 154 provides at least twice the amount of actuator power per unit volume as compared to donut-shaped HASEL actuators, while two pairs of fan portions 132, 154 provide at least four times the amount of actuator power per unit volume. The bridge portions 140, 162 interconnecting the fan portions 132, 154 also limit buckling of the fan portions 132, 154 by maintaining the distance between the channels 133, 155 and the central openings 146, 168. Because the bridge portions 140, 162 are integrally formed with the fan portions 132, 154, the bridge portions 140, 162 also prevent tearing and leakage between the fan portions 132, 154 by eliminating attachment locations that provide an increased risk of rupturing.

In operation, when the artificial muscle 100 is actuated, expansion of the expandable fluid region 196 produces a force of 20 Newton-millimeters (N·mm) per cubic centimeter (cm$^3$) of actuator volume or greater, such as 25 N·mm per cm$^3$ or greater, 30 N·mm per cm$^3$ or greater, 35 N·mm per cm$^3$ or greater, 40 N·mm per cm$^3$ or greater, or the like. In one example, when the artificial muscle 100 is actuated by a voltage of 9.5 kilovolts (kV), the artificial muscle 100 provides a resulting force of 20 N.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168. However, it should be noted that the size of the expandable fluid region 196 may remain equal to the size of the pass through region 197 as the size of the central openings 146, 168 is increased or reduced.

Figure 6C:
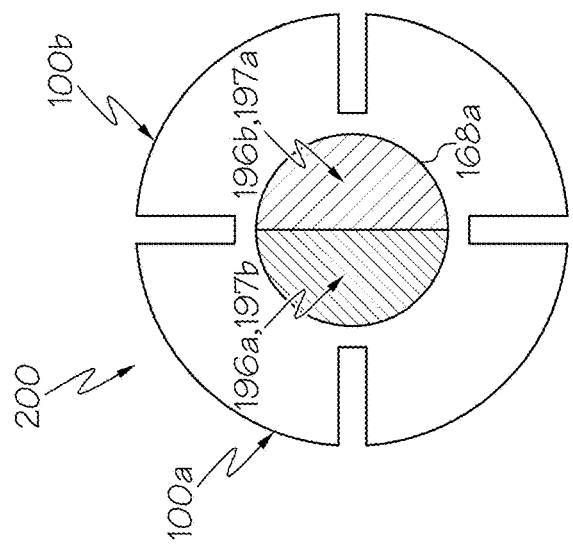
FIG. 6C schematically depicts a top view of the first artificial muscle of FIG. 6A and the second artificial muscle of FIG. 6B arranged in an artificial muscle assembly, according to one or more embodiments shown and described herein.
Figure 6B:
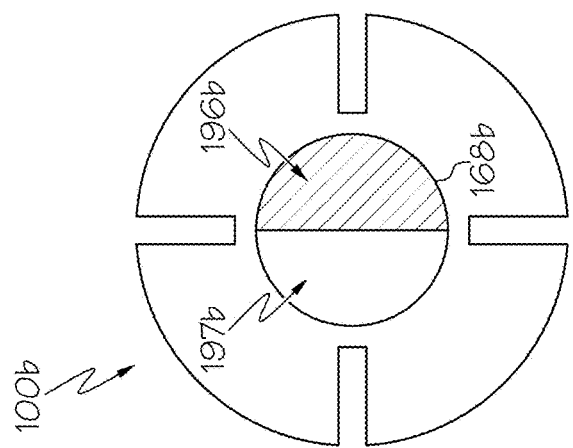
FIG. 6B schematically depicts a top view of a second artificial muscle in an artificial muscle assembly, according to one or more embodiments shown and described herein.
Figure 6A:
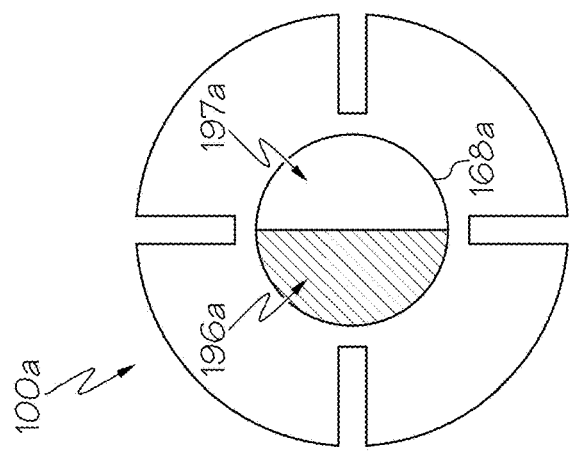
FIG. 6A schematically depicts a top view of a first artificial muscle in an artificial muscle assembly, according to one or more embodiments shown and described herein.

Referring now to FIGS. 6A-6C an artificial muscle assembly 200 is illustrated. The illustrative artificial muscle assembly 200 may include a plurality of artificial muscles 100, such as a first artificial muscle 100a (FIG. 6A) and a second artificial muscle 100b (FIG. 6B). As illustrated in FIGS. 6A and 6B, each of the first and second artificial muscles 100a, 100b may be identical in structure, with both of the first artificial muscles 100a, 100b including an expandable fluid region 196a, 196b, and a pass through region 197a, 197b which is defined by a central opening 168a, 168b. In these embodiments, the expandable fluid region 196a, 196b and the pass through region 197a, 197b of each artificial muscle 100a, 100b, may be equal in size.

For example, FIGS. 6A and 6B illustrate that the expandable fluid regions 196a, 196b and the pass through regions 197a, 197b each occupy half the space defined by the central opening 168a, 168b of the respective artificial muscles 100a, 100b.

As most clearly illustrated in FIG. 6C, the first artificial muscle 100a may be stacked on top of the second artificial muscle 100b in a stacked formation such that the expandable fluid region 196a of the first artificial muscle 100a overlies the pass through region 197b of the second artificial muscle 100b. In this configuration, the pass through region 196a of the first artificial muscle 100a may necessarily overlay the expandable fluid region 196b of the second artificial muscle 100b. In these embodiments, the terminal 130, 152 (FIG. 2) of each artificial muscle 100a, 100b may be electrically connected to one another such that the artificial muscles 100a, 100b may be simultaneously actuated between the non-actuated state and the actuated state.

Figure 7A:
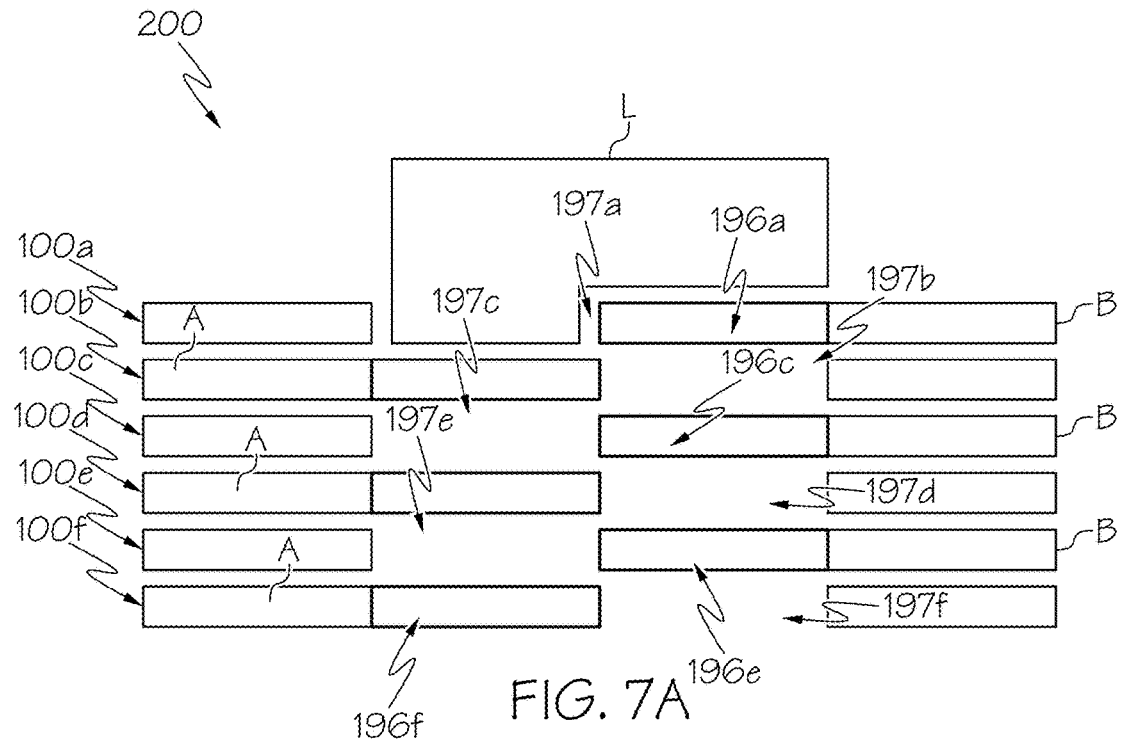
FIG. 7A schematically depicts a front view of the artificial muscle assembly of FIGS. 6A-6C in a non-actuated state, according to one or more embodiments shown and described herein.
Figure 7B:
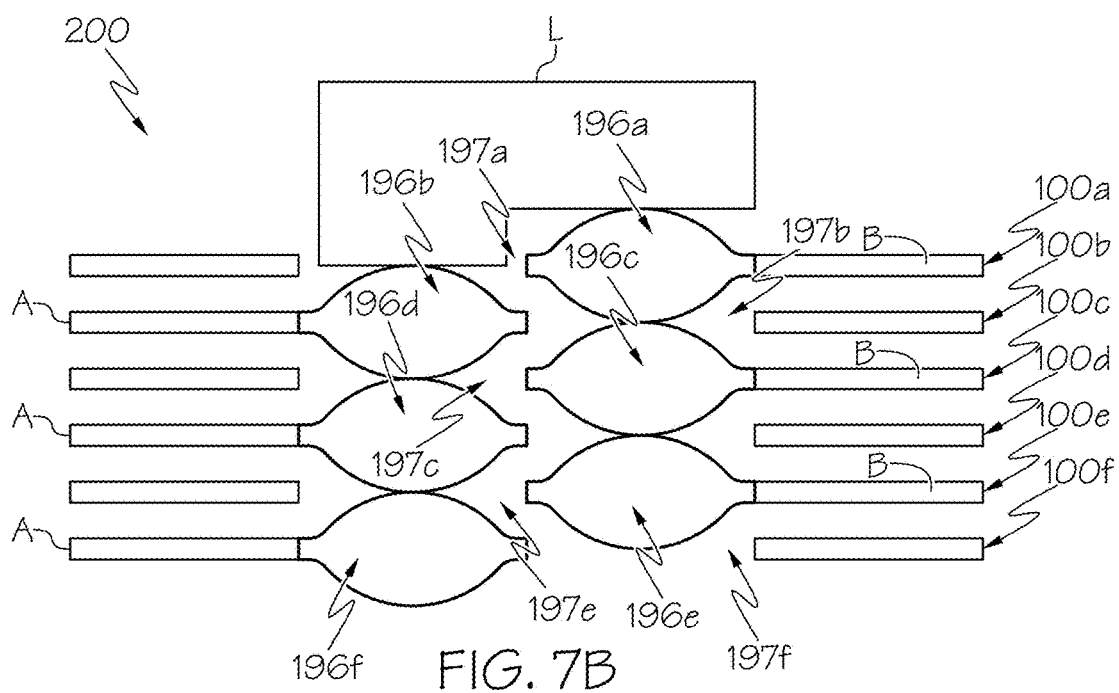
FIG. 7B schematically depicts a front view of the artificial muscle assembly of FIGS. 6A-6C in an actuated state, according to one or more embodiments shown and described herein.

Referring now to FIGS. 7A and 7B, the artificial muscle assembly 200 is shown in a non-actuated state (FIG. 7A) and an actuated state (FIG. 7B). In the embodiments illustrated in FIGS. 7A and 7B, the artificial muscle assembly 200 may include a plurality of artificial muscles 100, such as artificial muscles 100a-100f. Although FIGS. 7A and 7B illustrate the artificial muscle assembly 200 including six artificial muscles, it should be understood that the artificial muscle assembly 200 may include any number of artificial muscles 100. For example, the artificial muscle assembly 200 may include two, three, or four artificial muscles 100 without departing from the scope of the present disclosure.

FIG. 7A illustrates the plurality of artificial muscles 100a-100f in the non-actuated state. As illustrated in FIG. 7A, each of the plurality of muscles 100a are arranged in a stack, such that the expandable fluid region 196a-196f of each muscle is coaxially aligned with the pass through region 197a-197f of an adjacent one of the plurality of the artificial muscles 100a-100f. For example, the expandable fluid region 196b of artificial muscle 100b is coaxially positioned between the pass through region 197a of artificial muscle 100a and pass through region 197c of artificial muscle 100c.

In these embodiments, a load L may extend into the pass through region 197 of the uppermost artificial muscle 100 in the artificial muscle assembly 200, such that the load L contacts the expandable fluid region 196 of an adjacent artificial muscle 100. For example, FIG. 7A depicts a portion of the load L extending into the pass through region 197a of artificial muscle 100a and contacting the expandable fluid region 196b of artificial muscle 100b. By allowing the load L to extend into the pass through region 197a of the artificial muscle 100a and contact the expandable fluid region of 196b of artificial muscle 100b, the expandable fluid region 196a of the artificial muscle 100a and the expandable fluid region 196b of artificial muscle 100b may act on the load L simultaneously.

In this manner, the expandable fluid regions 196 of alternate artificial muscles 100 may act in tandem as a fluid stack to apply a force onto the load L. As illustrated in FIG. 7A, the expandable fluid regions 196b, 196d, 196f of artificial muscles 100b, 100d, 100f may be coaxially aligned in a first fluid stack A such that the force exerted by each of the expandable fluid regions 196b, 196d, 196f is additively applied to the load L. Similarly, the expandable fluid regions 196a, 196c, 196e of artificial muscles 100a, 100c, 100e may be coaxially aligned in a second fluid stack B such that the force exerted by each of the expandable fluid regions 196a, 196c, 196e is additively applied to the load L.

Turning now to FIG. 7B, the artificial muscle assembly 200 is shown in the actuated state. As illustrated, when an actuation voltage is applied to the plurality of artificial muscles 100a-100f, dielectric fluid 198 may fill the expandable fluid region 196a-196f of each artificial muscle 100a-100f such that the expandable fluid regions 196a-196f inflate. As the expandable fluid regions 196a-196f inflate, each of the expandable fluid regions 196a-196f may expand into the pass through region 197a-197f of each adjacent artificial muscle 100a-100f. For example, the expandable fluid region 196b of artificial muscle 100b may inflate such that the expandable fluid region 196b expands into the pass through regions 197a, 197c of artificial muscles 100a, 100c, respectively. Similarly, the expandable fluid region 196d of artificial muscle 100d may inflate such that the expandable fluid region 196d expands into the pass through regions 197c, 197e of artificial muscles 100c, 100e, respectively. In these embodiments, each of the expandable fluid regions 196 of the plurality of artificial muscles 100 may inflate such that the expandable fluid regions 196 extend into the pass through regions 197 of any adjacent artificial muscles 100 in the artificial muscle assembly 200.

As further illustrated in FIG. 7B, the expandable fluid regions 196 of alternate artificial muscles 100 may contact one another via the pass through regions 197 of adjacent artificial muscles 100 when the artificial muscles 100 are inflated to the actuated state. In this position, the expandable fluid regions 196 of fluid stack A may contact one another via the pass through regions 197 of the adjacent artificial muscles 100, while the expandable fluid regions 196 of fluid stack B may contact one another in a similar manner. For example, the expandable fluid regions 196b, 196d, 196f, which form fluid stack A, may contact one another via the pass through regions of artificial muscles 100c, 100e. More specifically, expandable fluid region 196b may contact expandable fluid region 196d via the pass through region 197c of artificial muscle 100c, while expandable fluid region 196d may contact expandable fluid region 196f via the pass through region 197e of artificial muscle 100e. It should be understood that the expandable fluid regions 196a, 196c, 196e, which form fluid stack B, may contact one another in a similar manner, such as via the pass through regions 197b, 197d of artificial muscles 100b, 100d, respectively.

By arranging the plurality of artificial muscles 100 of artificial muscle assembly 200 in the stacked configuration illustrated in FIGS. 7A and 7B, the expandable fluid regions 196 which form fluid stack A are able to work in tandem to apply a force on the load L in the actuated state. Similarly, the expandable fluid regions 196 which form fluid stack B are also able to work in tandem to apply a force on the load L. Additionally, the forces applied by the first fluid stack A and the second fluid stack B may work additively on load L. As such, the total force applied on the load L by the artificial muscle assembly 200 may be doubled without increasing the displacement of any of the individual artificial muscles 100.

Figure 8:
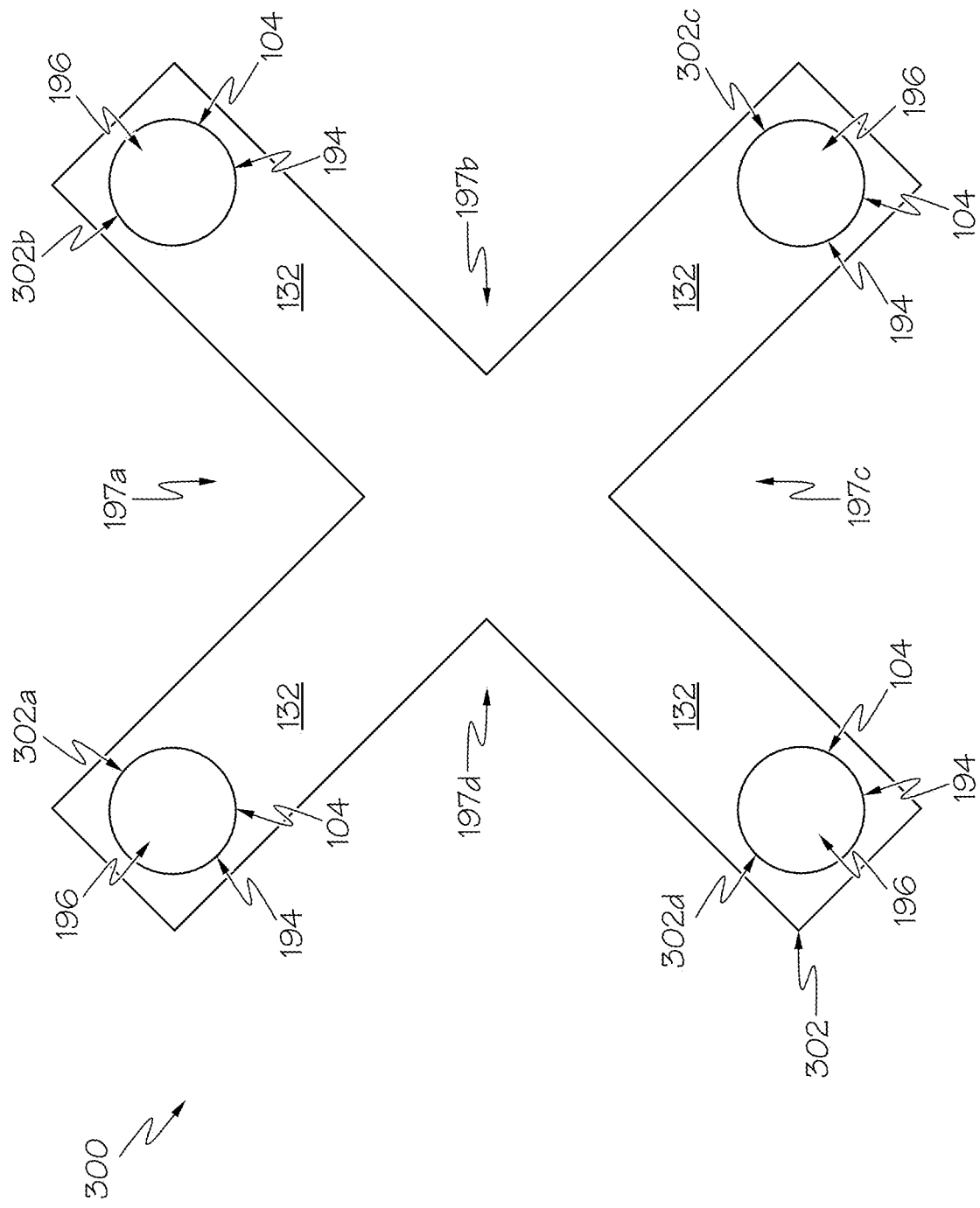
FIG. 8 schematically depicts a top view of another example of an artificial muscle according to one or more embodiments shown and described herein.
Figure 9:
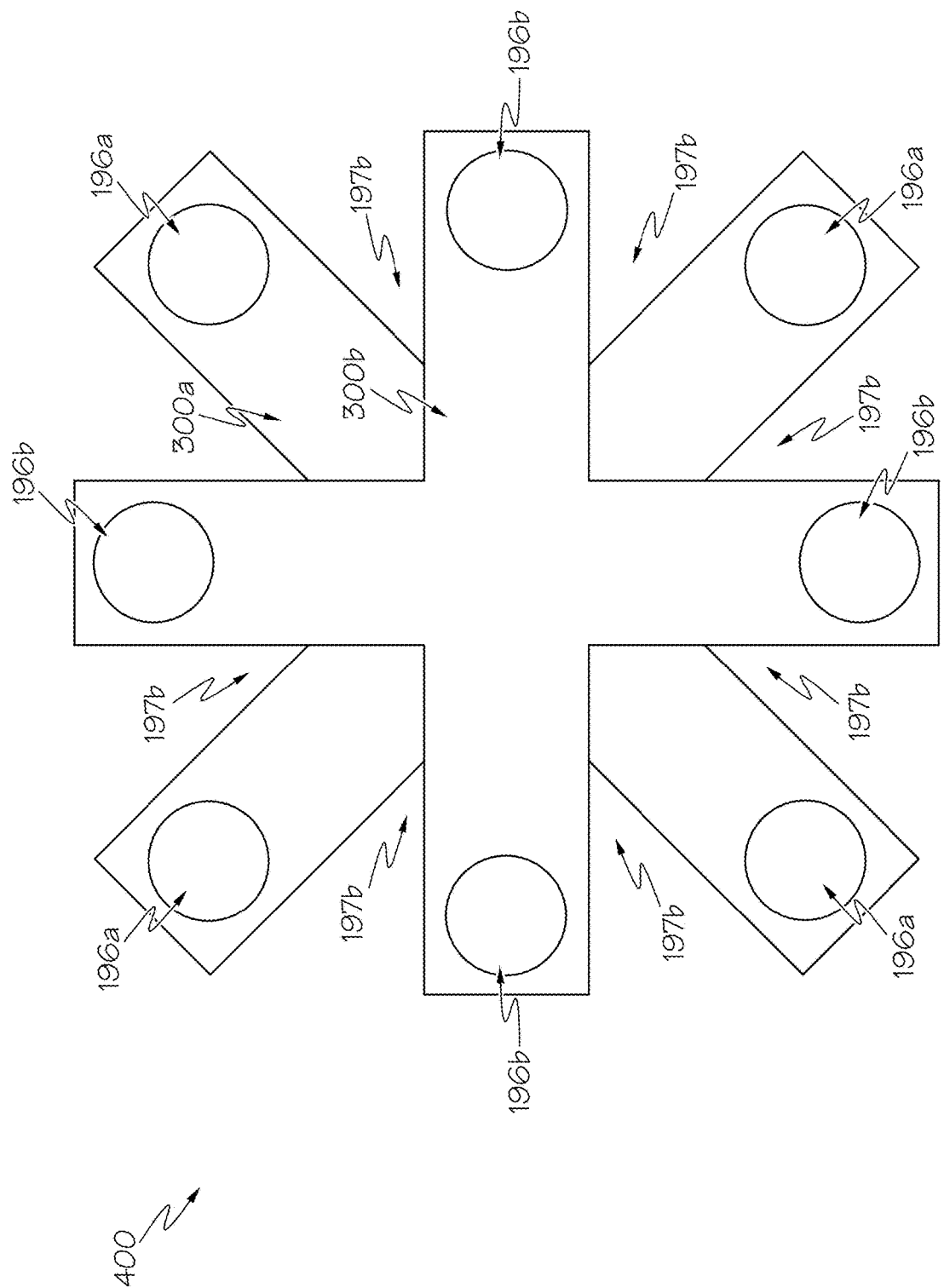
FIG. 9 schematically depicts a top view of another artificial muscle assembly including a plurality of the artificial muscles of FIG. 8, according to one or more embodiments shown and described herein.

Turning now to FIGS. 8 and 9, another embodiment of an artificial muscle 300 is illustrated. The artificial muscle 300 is structurally similar to the artificial muscle 100. As such, like structure is indicated with like reference numerals. The artificial muscle 300 includes an electrode region 194, in which the electrode pair 104 is provided, and an expandable fluid region 196, which is surrounded by the electrode region 194.

However, the artificial muscle 300 does not include central openings 146, 168, as is provided in the artificial muscle 100 illustrated in FIGS. 1-7. Instead, the artificial muscle 300 includes a plurality of distal openings 302a, 302b, 302c, 302d, which are positioned on respective distal ends 302 of the fan portions 132 of the artificial muscle 300. In these embodiments, the distal openings 302a-302d of the electrode pair 104 may define an expandable fluid region 196 on the distal end 302 of each of the fan portions 132. Furthermore, the pass through region 197 may be defined as the empty space between adjacent fan portions 132.

For example, as illustrated in FIG. 8, the artificial muscle 300 may include four fan portions 132, with each of the fan portions 132 including a distal opening 302a-302d which defines an expandable fluid region 196 on the distal end 302 of the fan portions 132. In these embodiments, the artificial muscle 300 may include four pass through regions 197a-197d, which are defined as the empty space between adjacent fan portions 132. In these embodiments, the pass through regions 197 may be of any size, so long as the size of the pass through regions 197 is greater than the size of the expandable fluid regions 196.

Furthermore, it should be understood that the artificial muscle 300 of FIG. 8 may include any number of fan portions 132. Although FIG. 8 illustrates the artificial muscle 300 as having four fan portions 132, the artificial muscle 300 could also feature two or three fan portions 132. In these embodiments, the number of expandable fluid regions 196 may equal the number of fan portions 132, with one expandable fluid region 196 being disposed on each of the fan portions 132. Additionally, the number of pass through regions 197 may equal the number of the fan portions 132 and the number of expandable fluid regions 196, with one pass through region 197 being positioned in the space between each adjacent fan portion 132.

Referring now to FIG. 9, another artificial muscle assembly 400 including a plurality of the artificial muscles 300 is depicted. As shown in FIG. 9, the artificial muscle assembly 400 may include a plurality of artificial muscles 300, such as artificial muscles 300a, 300b. Although FIG. 9 illustrates the artificial muscle assembly 400 as having two artificial muscles 300, it should be understood that the artificial muscle assembly 400 may include any number of artificial muscles 300.

In these embodiments, the artificial muscles 300 may be arranged in a stack, such that the central regions of the artificial muscles 300 are aligned and the expandable fluid regions 196 of each artificial muscle 300 are coaxial with corresponding pass through regions 197 of an adjacent artificial muscle 300. For example, FIG. 9 illustrates artificial muscle 300a having expandable fluid regions 196a and pass through regions 197a. Artificial muscle 300b is stacked on artificial muscle 300a, such that the pass through regions 197b of artificial muscle 300b overlay the expandable fluid regions 196a of artificial muscle 300a.

By arranging the artificial muscles 300 in the stacked configuration shown in FIG. 9, the expandable fluid regions 196 may inflate such that the expandable fluid regions 196 pass into the pass through regions 197 of any adjacent artificial muscles 300 when the artificial muscles 300 are in the actuated state. As a result, the expandable fluid regions 196 of each artificial muscle are able to supply an additive force on a load when the expandable fluid regions 196 are inflated.

Referring now to FIG. 10, an actuation system 500 may be provided for operating an artificial muscle or an artificial muscle assembly, such as the artificial muscles 100, 100', 300 or the artificial muscle assembly 200, 400 between the non-actuated state and the actuated state. Thus, the actuation system 500 may include a controller 502, an operating device 504, a power supply 506, and a communication path 508. The various components of the actuation system 500 will now be described.

The controller 502 includes a processor 510 and a non-transitory electronic memory 512 to which various components are communicatively coupled. In some embodiments, the processor 510 and the non-transitory electronic memory 512 and/or the other components are included within a single device. In other embodiments, the processor 510 and the non-transitory electronic memory 512 and/or the other components may be distributed among multiple devices that are communicatively coupled. The controller 502 includes non-transitory electronic memory 512 that stores a set of machine-readable instructions. The processor 510 executes the machine-readable instructions stored in the non-transitory electronic memory 512. The non-transitory electronic memory 512 may comprise RAM, ROM, flash memories, hard drives, or any device capable of storing machine-readable instructions such that the machine-readable instructions can be accessed by the processor 510. Accordingly, the actuation system 500 described herein may be implemented in any conventional computer programming language, as pre-programmed hardware elements, or as a combination of hardware and software components. The non-transitory electronic memory 512 may be implemented as one memory module or a plurality of memory modules.

In some embodiments, the non-transitory electronic memory 512 includes instructions for executing the functions of the actuation system 500. The instructions may include instructions for operating the artificial muscles 100, 100', 300 or the artificial muscle assembly 200, 400 based on a user command.

The processor 510 may be any device capable of executing machine-readable instructions. For example, the processor 510 may be an integrated circuit, a microchip, a computer, or any other computing device. The non-transitory electronic memory 512 and the processor 510 are coupled to the communication path 508 that provides signal interconnectivity between various components and/or modules of the actuation system 500. Accordingly, the communication path 508 may communicatively couple any number of processors with one another, and allow the modules coupled to the communication path 508 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 10, the communication path 508 communicatively couples the processor 510 and the non-transitory electronic memory 512 of the controller 502 with a plurality of other components of the actuation system 500. For example, the actuation system 500 depicted in FIG. 9 includes the processor 510 and the non-transitory electronic memory 512 communicatively coupled with the operating device 504 and the power supply 506.

The operating device 504 allows for a user to control operation of the artificial muscles 100, 100', 300 or the artificial muscle assembly 200, 400. In some embodiments, the operating device 504 may be a switch, toggle, button, or any combination of controls to provide user operation. As a non-limiting example, a user may actuate the artificial muscles 100, 100', 300 or the artificial muscle assembly 200, 400 into the actuated state by activating controls of the operating device 504 to a first position. While in the first position, the artificial muscles 100, 100', 300 or the artificial muscle assembly 200, 400 will remain in the actuated state. The user may switch the artificial muscles 100, 100', 300 or the artificial muscle assembly 200, 400 into the non-actuated state by operating the controls of the operating device 504 out of the first position and into a second position.

The operating device 504 is coupled to the communication path 508 such that the communication path 508 communicatively couples the operating device 504 to other modules of the actuation system 500. The operating device 504 may provide a user interface for receiving user instructions as to a specific operating configuration of the artificial muscles 100, 100', 300 or the artificial muscle assembly 200, 400. In addition, user instructions may include instructions to operate the artificial muscles 100, 100', 300 or the artificial muscle assembly 200, 400 only at certain conditions.

The power supply 506 (e.g., battery) provides power to the artificial muscles 100, 100', 300 or the artificial muscle assembly 200, 400. In some embodiments, the power supply 506 is a rechargeable direct current power source. It is to be understood that the power supply 506 may be a single power supply or battery for providing power to the artificial muscle 100, 100', 300 or the artificial muscle assembly 200, 400. A power adapter (not shown) may be provided and electrically coupled via a wiring harness or the like for providing power to the artificial muscles 100, 100', 300 or the artificial muscle assembly 200, 400 via the power supply 506.

In some embodiments, the actuation system 500 also includes a display device 514. The display device 514 is coupled to the communication path 508 such that the communication path 508 communicatively couples the display device 514 to other modules of the actuation system 500. The display device 514 may output a notification in response to an actuation state of the artificial muscles 100, 100', 300 or the artificial muscle assembly 200, 400 or indication of a change in the actuation state of the artificial muscles 100, 100', 300 or the artificial muscle assembly 200, 400. Moreover, the display device 514 may be a touchscreen that, in addition to providing optical information, detects the presence and location of a tactile input upon a surface of or adjacent to the display device 514. Accordingly, the display device 514 may include the operating device 504 and receive mechanical input directly upon the optical output provided by the display device 514.

In some embodiments, the actuation system 500 includes network interface hardware 516 for communicatively coupling the actuation system 500 to a portable device 518 via a network 520. The portable device 518 may include, without limitation, a smartphone, a tablet, a personal media player, or any other electric device that includes wireless communication functionality. It is to be appreciated that, when provided, the portable device 518 may serve to provide user commands to the controller 502, instead of the operating device 504. As such, a user may be able to control or set a program for controlling the artificial muscles 100, 100', 300 or the artificial muscle assembly 200, 400 without utilizing the controls of the operating device 504. Thus, the artificial muscles 100, 100', 300 or the artificial muscle assembly 200, 400 may be controlled remotely via the portable device 518 wirelessly communicating with the controller 502 via the network 520.

From the above, it is to be appreciated that defined herein are artificial muscles for inflating or deforming a surface of an object by selectively actuating the artificial muscle to raise and lower a region thereof. This provides a low profile inflation member that may operate on demand.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An artificial muscle comprising:
a housing comprising an electrode region, an expandable fluid region, and a pass through region formed between the electrode region and the expandable fluid region;
an electrode pair comprising a first electrode and a second electrode, at least one of the first electrode and the second electrode including a central opening encircling the pass through region and the expandable fluid region; and
a dielectric fluid housed within the housing;
wherein the electrode pair is actuatable between a non-actuated state and an actuated state such that actuation from the non-actuated state to the actuated state directs the dielectric fluid into the expandable fluid region.

2. The artificial muscle of claim 1, wherein the first electrode and the second electrode each comprise:
a plurality of fan portions, each fan portion including a first side edge having a first side length, a second side edge having a second side length, a first end having an inner length, and a second end having an outer length, the first end and the second end extending between the first side edge and the second side edge, the outer length being greater than the inner length; and
a plurality of bridge portions, each bridge portion interconnecting adjacent fan portions at the first end.

3. The artificial muscle of claim 1, wherein the pass through region and the expandable fluid region are equal in size.

4. The artificial muscle of claim 1, wherein the housing comprises a first film layer and a second film layer partially sealed to one another to define a sealed portion of the housing, the housing further comprising an unsealed portion surrounded by the sealed portion, wherein the electrode region and the expandable fluid region of the housing are disposed in the unsealed portion.

5. The artificial muscle of claim 4, wherein the first film layer and the second film layer each include a pass through opening formed therein, the pass through openings being coaxial with one another.

6. The artificial muscle of claim 4, wherein a first inner surface of the first film layer is partially sealed to a second inner surface of the second film layer.

7. The artificial muscle of claim 4, further comprising a first electrical insulator layer provided between the first electrode and the second electrode.

8. The artificial muscle of claim 7, wherein the first electrical insulator layer comprises a pass through opening positioned coaxially with the pass through opening formed in the first film layer and the pass through opening formed in the second film layer.

9. The artificial muscle of claim 8, further comprising a second electrical insulator layer provided between the first electrode and the second electrode, the second electrical insulator layer comprising a pass through opening positioned coaxially with the pass through opening of the first electrical insulator layer.

10. An artificial muscle assembly comprising:
a plurality of artificial muscles, each artificial muscle comprising:
a housing comprising an electrode region, an expandable fluid region, and a pass through region formed between the electrode region and the expandable fluid region;
an electrode pair comprising a first electrode and a second electrode, at least one of the first electrode and the second electrode including a central opening having the pass through region and the expandable fluid region; and
a dielectric fluid housed within the housing;
wherein the plurality of artificial muscles is arranged in a stack such that the expandable fluid region of each artificial muscle is coaxially aligned with a pass through region of an adjacent one of the plurality of artificial muscles; and
wherein the electrode pair of each artificial muscle is actuatable between a non-actuated state and an actuated state such that actuation from the non-actuated state to the actuated state directs the dielectric fluid into the expandable fluid region and the expandable fluid region passes through the pass through region of an adjacent artificial muscle.

11. The artificial muscle assembly of claim 10, wherein the first electrode and the second electrode each comprise:
a plurality of fan portions, each fan portion including a first side edge having a first side length, a second side edge having a second side length, a first end having an inner length, and a second end having an outer length, the first end and the second end extending between the first side edge and the second side edge, the outer length being greater than the inner length; and
a plurality of bridge portions, each bridge portion interconnecting adjacent fan portions at the first end.

12. The artificial muscle assembly of claim 10, wherein the pass through region and the expandable fluid region are equal in size.

13. The artificial muscle assembly of claim 10, wherein the housing comprises a first film layer and a second film layer partially sealed to one another to define a sealed portion of the housing, the housing further comprising an unsealed portion surrounded by the sealed portion, wherein the electrode region and the expandable fluid region of the housing are disposed in the unsealed portion.

14. The artificial muscle assembly of claim 13, wherein the first film layer and the second film layer each include a pass through opening formed therein, the pass through openings being coaxial with one another.

15. The artificial muscle assembly of claim 13, further comprising a first electrical insulator layer provided between the first electrode and the second electrode.

16. The artificial muscle assembly of claim 15, wherein the first electrical insulator layer comprises a pass through opening positioned coaxially with the pass through opening formed in the first film layer and the pass through opening formed in the second film layer.

17. The artificial muscle assembly of claim 16, further comprising a second electrical insulator layer provided between the first electrode and the second electrode, the second electrical insulator layer comprising a pass through opening positioned coaxially with the pass through opening of the first electrical insulator layer.

18. An artificial muscle assembly comprising:
- a plurality of artificial muscles, each artificial muscle being identical in structure, each artificial muscle comprising:
  - an expandable fluid region;
  - a pass through region adjacent the expandable fluid region; and
  - an electrode region surrounding the expandable fluid region and the pass through region,
- wherein the plurality of artificial muscles are positioned such that the expandable fluid region of each artificial muscle is coaxial with a corresponding pass through region of an adjacent artificial muscle.

19. The artificial muscle assembly of claim 18, further comprising a plurality of fan portions, wherein the expandable fluid region is formed at a distal end of each of the plurality of fan portions.

20. The artificial muscle assembly of claim 19, wherein the pass through region is defined by a space between adjacent fan portions.

* * * * *